United States Patent
Barsness et al.

(10) Patent No.: US 11,327,976 B2
(45) Date of Patent: May 10, 2022

(54) AUTONOMIC FUSION CHANGES BASED OFF DATA RATES

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1485 days.

(21) Appl. No.: 14/960,168

(22) Filed: Dec. 4, 2015

(65) Prior Publication Data

US 2017/0161332 A1  Jun. 8, 2017

(51) Int. Cl.
*G06F 16/24* (2019.01)
*G06F 16/2455* (2019.01)
*G06F 16/245* (2019.01)

(52) U.S. Cl.
CPC .. *G06F 16/24568* (2019.01); *G06F 16/24569* (2019.01)

(58) Field of Classification Search
CPC ......... G06F 17/30516; G06F 17/30519; G06F 16/24568; G06F 16/24569; G06F 16/24
USPC ........................................................ 707/803
See application file for complete search history.

(56) References Cited

U.S. PATENT DOCUMENTS

| | | | |
|---|---|---|---|
| 7,613,848 B2 | 11/2009 | Amini et al. | |
| 8,201,171 B2 | 6/2012 | Duffy et al. | |
| 8,423,979 B2 | 4/2013 | Archambault et al. | |
| 8,990,628 B2 | 3/2015 | Branson et al. | |
| 8,990,827 B2 | 3/2015 | Wu et al. | |
| 2004/0052212 A1 | 3/2004 | Baillargeon | |
| 2009/0007116 A1* | 1/2009 | Duffy | G06F 16/24532 718/100 |
| 2013/0166948 A1 | 6/2013 | Branson et al. | |
| 2013/0290966 A1* | 10/2013 | Branson | G06F 11/3433 718/102 |

(Continued)

OTHER PUBLICATIONS

Liu et al., "Stream processing in data-driven computational science". Proceedings of the 7th IEEE/ACM International Conference, 2006, pp. 160-167.

*Primary Examiner* — Hosain T Alam
*Assistant Examiner* — Tracy M McGhee
(74) *Attorney, Agent, or Firm* — Matthew J. Bussan

(57) ABSTRACT

In a streaming application receiving streaming data to be processed by a plurality of processing elements (PEs), one of a plurality of upstream PEs that reside on separate compute nodes and transmit data to a multi-input port PE is selected based on a data flow rate measured between at least two components in the plurality of PEs (e.g., an amount of incoming data per unit time or an amount of network bandwidth). At least one operator from the selected upstream PE is redeployed into the multi-input port PE. In some embodiments, the operator is selected from among a plurality of operators fused together in the selected upstream PE, un-fused from the selected upstream PE, and fused into the multi-input port PE. In some embodiments, a dynamic fusing capability is realized by selecting different ones of the plurality of upstream PEs in response to changes in the measured data flow rate.

17 Claims, 10 Drawing Sheets

(56) References Cited

U.S. PATENT DOCUMENTS

| | | | |
|---|---|---|---|
| 2014/0136723 A1* | 5/2014 | Branson | H04L 65/607 709/231 |
| 2014/0317304 A1 | 10/2014 | Branson et al. | |
| 2015/0207751 A1 | 7/2015 | Branson et al. | |

* cited by examiner

AUTONOMIC FUSION CHANGES BASED OFF DATA RATES

BACKGROUND

The present invention relates in general to the field of stream computing. More particularly, the present invention relates to using data flow rates to implement autonomic fusion changes in a stream computing application.

SUMMARY

Embodiments of the present disclosure include a method, system and computer program product. The method, system and computer program product include receiving streaming data to be processed by a plurality of processing elements, each processing element comprising one or more operators that process at least a portion of the received data, wherein one of the processing elements is a multiple input port processing element configured to receive data from at least two upstream processing elements, and wherein each of the at least two upstream processing elements resides on a separate compute node. The method, system and computer program product also include measuring a data flow rate in a data path between at least two components in the plurality of processing elements. The method, system and computer program product include selecting one of the at least two upstream processing elements based on the measured data flow rate. The method, system and computer program also include redeploying at least one operator from the selected one of the at least two upstream processing elements to the multiple input port processing element.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
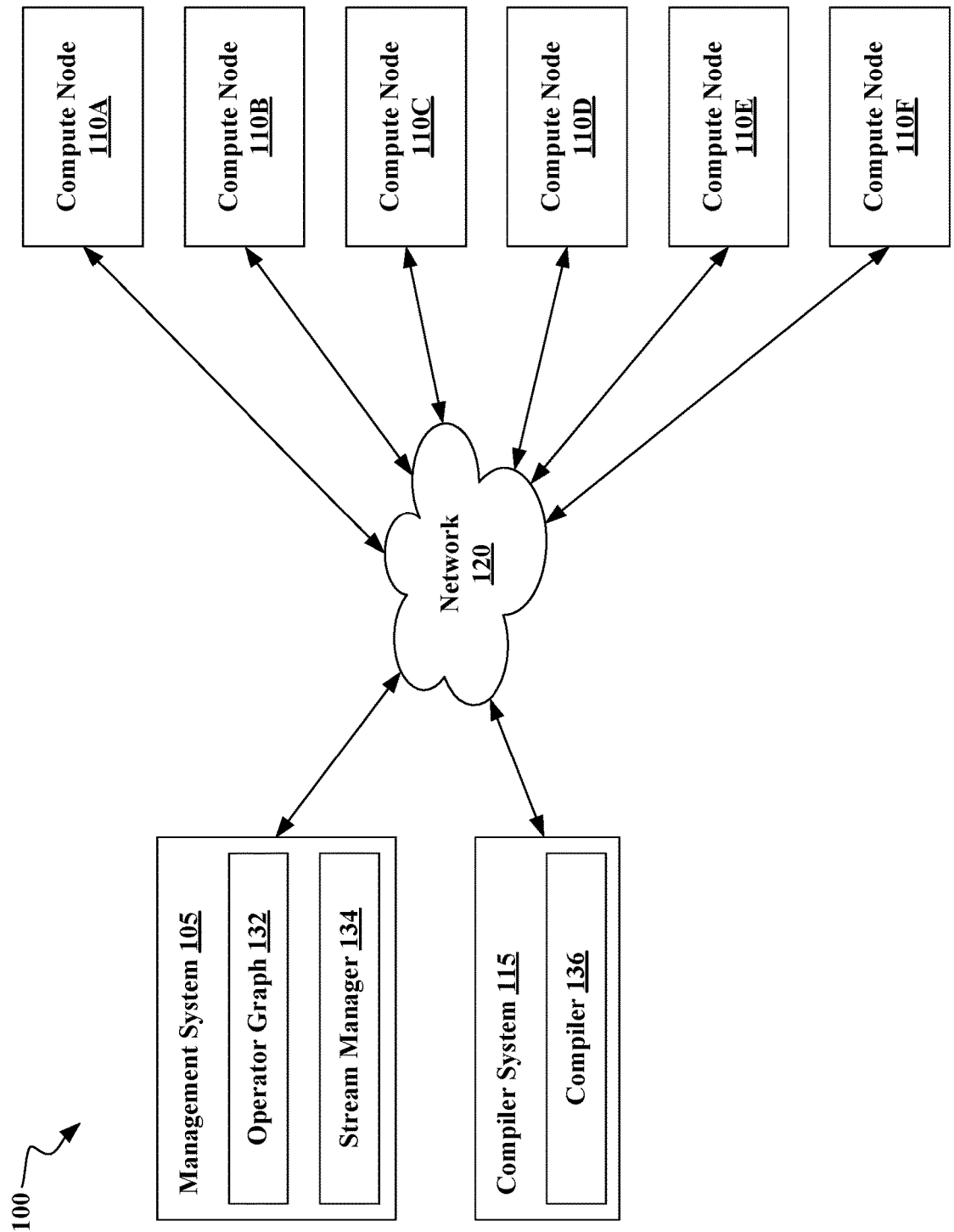
FIG. 1 illustrates a computing infrastructure configured to execute a stream computing application, according to some embodiments of the present invention.

While computer databases have become extremely sophisticated, the computing demands placed on database systems have also increased at a rapid pace. Conventional database systems are typically configured to separate the process of storing data from accessing, manipulating or using data stored in the database. More specifically, conventional databases use a model where data is first stored, then indexed, and finally queried. However, this model cannot meet the performance requirements of some real-time applications. For example, the rate at which a conventional database system can receive and store incoming data limits how much data can be processed or otherwise evaluated. This, in turn, can limit the ability of database applications to process large amounts of data in real-time.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in nanoseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating many small executable pieces of code (i.e., processing elements), each one of which contains one or more processing modules (i.e., operators). These processing elements can also be replicated on multiple nodes with load balancing among them. Operators in a stream computing application can be fused together to form a processing element that is executable. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

One advantage of stream computing applications is that they allow the user to granularly control the process flow of data through the application. In other words, the user may designate specific operators to perform various operations on the incoming data, and may dynamically alter the stream computing application by modifying the operators and the order in which they are performed. Additionally, stream computing applications are able to handle large volumes of data.

Another advantage of stream computing is that processing elements can be quickly moved into and out of the operator graph. Additionally, a processing element can contain a plurality of fused operators that are encapsulated within a single process running on a compute node. By fusing multiple operators together in a single process, these operators may be able to communicate with one another very efficiently, relative to a configuration where each operator is running in a separate process on the same compute node or a different compute node. However, fusing does have its limitations. Take, for example, a situation where a processing element has multiple input ports. For security or other reasons (e.g., network bandwidth), each processing element that feeds one of the input ports of the multiple input port processing element exists on a separate compute node within the cluster. In this situation it is only possible for the multiple input port processing element to be fused with one of the processing elements (or operator(s) thereof) feeding it data. But alas which one? This is a key question that is answered (and the answer may change at run time) in accordance with embodiments of the present invention.

As such, some embodiments of the present invention provide techniques for determining how to fuse processing elements in this situation (i.e., where a processing element has multiple input ports) and for dynamically managing a fused processing element with multiple input ports. Some embodiments may receive streaming data to be processed by a plurality of processing elements. Additionally, an operator graph of the plurality of processing elements is established. Generally, the operator graph defines at least one execution path between the processing elements in the plurality of processing elements. Furthermore, a multiple input port processing element of the operator graph is configured with multiple input ports to receive data from one or more upstream processing elements and usually has an output port to transmit data to at least one downstream processing element. Each of the plurality of upstream processing elements feeding data to the input ports of the multiple input port processing element resides on a separate compute node. Some embodiments may monitor the amount of incoming data at the multiple input ports from each of the upstream processing elements or the amount of network bandwidth (e.g., the network bandwidth may be monitored at a network interface card (NIC) for each of the compute nodes on which the upstream processing elements reside) to determine which one of the upstream processing elements (or operator(s) thereof) to fuse with the multiple input port processing element. Generally, a fused processing element is a processing element having a plurality of operators all contained within a single process executing on a compute node. Some embodiments provide a dynamic fusing capability, wherein the multiple input port processing element is fused to different ones of the upstream processing elements (or operator(s) thereof) at run time as the monitored rates change.

Certain problems may arise, for example, in one of the processing elements feeding data to one of the input ports of the multiple input port processing element. For example, consider an embodiment where the upstream processing element (in which a problem arises) contains a collection of fused operators. The upstream processing element in which a problem arises may be, for example, implemented as a Java application containing a plurality of operators, each running a separate thread. In such an embodiment, a problem could arise when one of the operators begins consuming a substantial amount of network bandwidth in communicating between itself and the multiple input port processing element, to the point where the Java application process experiences backpressure or exceeds its allocated maximum amount of network bandwidth. "Backpressure" is a term used to describe a situation where one or more operators are unable to transmit or receive additional data because either their buffer or a buffer associated with a downstream operator is full. Fusing, at least temporarily, the upstream processing element in which a problem arises (or operator(s) thereof) into the multiple input port processing element may alleviate the problem because these processing elements (or operator(s) thereof) are allowed to share a common process space, resulting in much faster communication between operators than is available using inter-process communication techniques (e.g., using a TCP/IP socket).

In accordance with some embodiments of the present invention, one of the possessing elements feeding data to the input ports of the multiple input port processing element is selected based on a data flow rate. For example, consider an embodiment where the selected upstream processing element in which a problem arises contains a collection of fused operators. At least one of the fused operators of the selected upstream processing element may be selected for redeployment. The selected fused operator or operators may then be un-fused from the selected upstream processing element and fused with the operators of the multiple input port processing element. Advantageously, doing so allows for problems with the selected upstream processing element to be corrected by removing the selected fused operator or operators from within the selected upstream processing element and redeploying the selected operator(s) into the multiple input port processing element, and may do so without interrupting the processing of the other fused operators within the selected upstream processing element. Fusing, at least temporarily, the selected operator(s) into the multiple input port processing element may correct the problems with the selected upstream processing element because the selected operator(s) are allowed to share a common process space with the operator(s) of the multiple input port processing element, resulting in much faster communication between operators than is available using inter-process communication techniques (e.g., using a TCP/IP socket).

The amount of incoming data to a multiple input port processing element (or operator(s) thereof) at its various input ports is monitored, in accordance with some embodiments of the present invention, and a determination of which operators should be fused together is based on network utilization rates. That is, based on network utilization rates, a determination is made of which operator(s) from which one of the upstream processing elements should be fused together with the operator(s) contained in the multiple input port processing element. In some embodiments, the network utilization rates may simply be, for each given port of the upstream processing elements sending data to an operator of the multiple input port processing element, the overall amount of data that port is sending to the operator. In other embodiments, the network utilization rates may be the overall network bandwidth of each source machine. This latter embodiment allows the determination of which operators should be fused to be driven, at least in part, by a possible desire to alleviate the overall network bandwidth of a particular source machine.

At least one of a plurality of fused operators, in accordance with some embodiments of the present invention, may be selected for removal from the determined upstream processing element, i.e., the upstream processing element that is determined should be fused together with the multiple input port processing element. For example, embodiments could identify within the determined upstream processing element an operator that is providing data to the multiple input port processing element and could select this operator for removal from the determined upstream processing element. The operator selected for removal could then be redeployed and fused with the one or more operators of the multiple input port processing element. Advantageously, selective ones of the fused operators within the determined upstream processing element may be removed (unfused), redeployed and fused with the one or more operators of the multiple input port processing element, without interrupting the processing of the other fused operators within the determined upstream processing element.

A "tuple" is data. More specifically, a tuple is a sequence of one or more attributes associated with an entity. Attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used herein, "stream" or "data stream" refers to a sequence of tuples, as well as other data formats (e.g., data marked up as XML documents). In the context of tuples, a stream may be considered a pseudo-infinite sequence of tuples.

Tuples are received and output by processing elements. A tuple corresponding with a particular entity, i.e., a particular piece of data, received by a processing element, however, is generally not considered to be the same tuple that is output downstream, even if it corresponds with the same entity or data. Typically, the output tuple is changed in some way by the processing element. An attribute or metadata may be added, deleted, or changed. However, it is not required that the output tuple be changed in some way. Generally, a particular tuple output by a processing element may not be considered the same tuple as a corresponding input tuple even if the input tuple is not changed by the processing element.

Further, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, some embodiments of the present invention may be configured to operate in a clustered environment with a standard database processing application.

FIG. 1 illustrates one exemplary computing infrastructure 100 that may be configured to execute a stream computing application, according to some embodiments of the present invention. The computing infrastructure 100 includes a management system 105 and two or more compute nodes 110A-110F, which are communicatively coupled to each other using one or more communications networks 120. The communications network 120 may include one or more servers, networks, or databases, and may use a particular communications protocol to transfer data between the compute nodes 110A-110F. A compiler system 115 may be communicatively coupled with the management system 105 and the compute nodes 110A-110F, either directly or via the communications network 120.

The management system 105 includes an operator graph 132 and a stream manager 134. The operator graph 132 represents a stream computing application beginning from one or more source processing elements (PEs) through to one or more sink PEs. This flow from source to sink is also generally referred to herein as an execution path. However, an operator graph may be a plurality of linked together executable units (i.e., processing elements) with or without a specified source or sink. Thus, an execution path would be the particular linked together execution units that data traverses as it propagates through the operator graph.

Generally, data attributes flow into a source PE of a stream computing application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes 110A-110F, as well as to change the structure of the operator graph 132. The stream manager 134 may move processing elements (PEs) from one compute node 110 to another, for example, to manage the processing loads of the compute nodes 110 in the computing infrastructure 100. Further, the stream manager 134 may control the stream computing application by inserting, removing, fusing, un-fusing, or otherwise modifying the processing elements (or what datatuples flow to the processing elements) running on the compute nodes 110A-110F. One example of a stream computing application is IBM® InfoSphere® Streams, available from International Business Machines Corporation.

The compiler system 115 includes a compiler 136. The compiler 136 compiles modules, which include source code or statements, into the object code, which includes machine instructions that execute on a processor.

Figure 2:
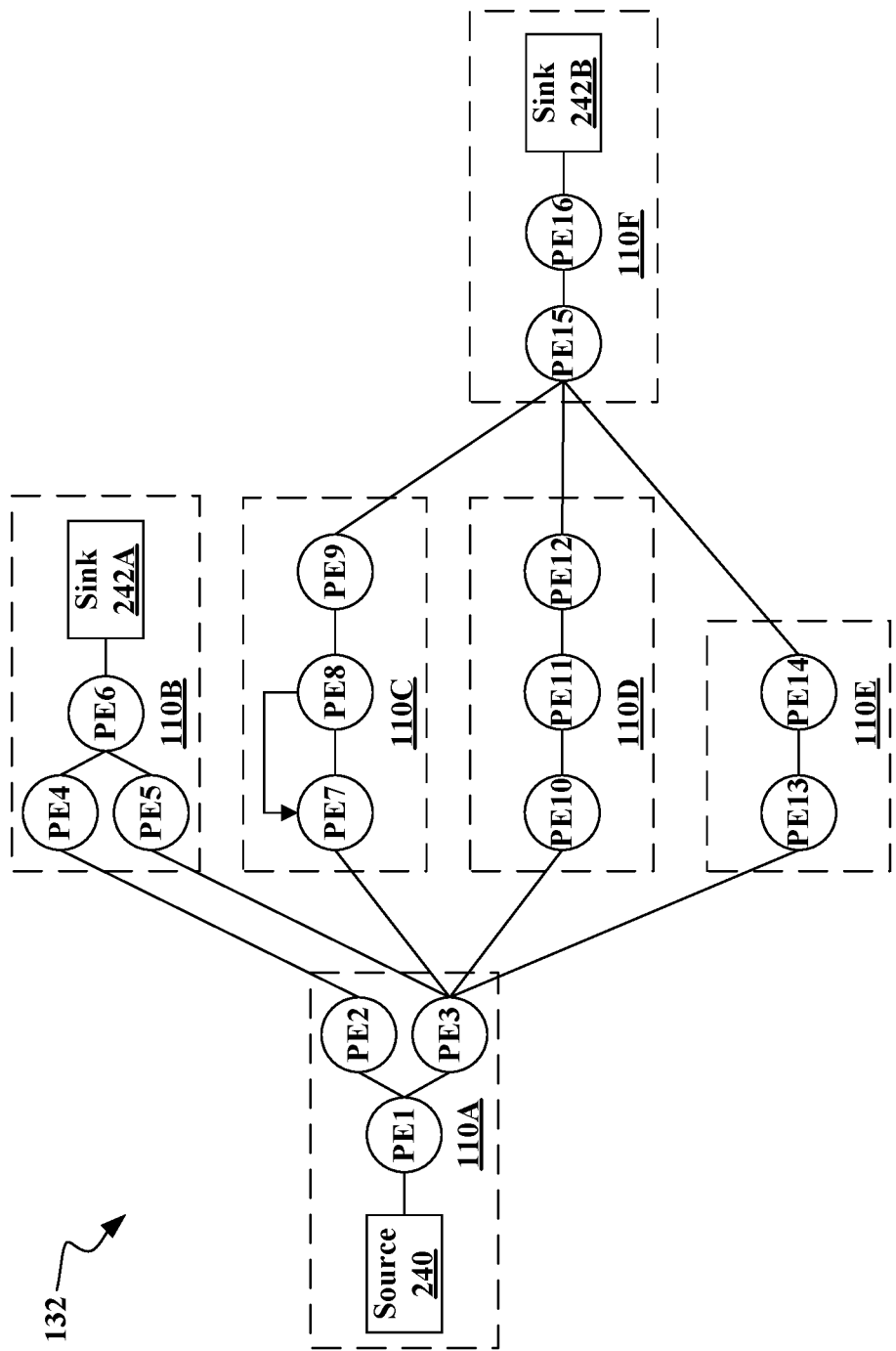
FIG. 2 illustrates an operator graph for a stream computing application, according to some embodiments of the present invention.

FIG. 2 illustrates an example operator graph 132 that includes sixteen processing elements (labeled as PE1-PE16) running on the compute nodes 110A-110F. Of note, because a processing element is a collection of fused operators, it is equally correct to describe the operator graph as execution paths between specific operators, which may include execution paths to different operators within the same processing element. FIG. 2 illustrates execution paths between processing elements for the sake of clarity. While a single operator within a processing element may be executed as an independently running process with its own process ID (PID) and memory space, multiple operators may also be fused together into a processing element to run as a single process (with a PID and memory space). In cases where two (or more) operators are running in independent processing elements, inter-process communication may occur using a "transport" (e.g., a network socket, a TCP/IP socket, or shared memory). However, when operators are fused together, the operators within a processing element can use more rapid communication techniques for passing tuples (or other data) between the operators.

As shown, the operator graph 132 begins at a source 240 (that flows into the processing element labeled PE1) and ends at sinks 242A and 242B (that flow from the processing elements labeled as PE6 and PE16, respectively). Compute node 110A includes the processing elements PE1, PE2 and PE3. Compute node 110B includes the processing elements PE4, PE5 and PE6. Compute node 110C includes the processing elements PE7, PE8 and PE9. Compute node 110D includes processing elements PE10, PE11 and PE12. Compute node 110E includes processing elements PE13 and PE14. Compute node 110F includes processing elements PE 15 and PE16.

Source 240 flows into the processing element PE1, which in turn emits tuples that are received by PE2 and PE3. Of note, although the operators within the processing elements are not shown in FIG. 2, in some embodiments the data tuples flow between operators within the processing elements rather than between the processing elements themselves. For example, one or more operators within PE1 may split data attributes received in a tuple and pass some data attributes to one or more other operators within PE2, while passing other data attributes to one or more additional operators within PE3. Data that flows to PE2 is processed by the operators contained in PE2, and the resulting tuples are then emitted to PE4 on compute node 110B. Likewise, the data tuples emitted by PE4 flow to sink PE6 242A. Similarly, data tuples flowing from PE3 to PE5 (i.e., from operator(s) within PE3 to operator(s) within PE5) also reach sink PE6 242A. Thus, in addition to being a sink for this example operator graph, PE6 could be configured to perform a join operation, combining tuples received from PE4 and PE5.

This example operator graph also shows data tuples flowing from PE3 to PE7 on compute node 110C, which itself shows data tuples flowing to PE8 and looping back to PE7. Data tuples emitted from PE8 flow to PE9. Data tuples emitted from PE9 flow to PE15 on compute node 110F, which in turn emits tuples to be processed by sink PE16 242B.

Further, this example operator graph shows data tuples flowing from PE3 to PE10 on compute node 110D, which itself shows data tuples flowing to PE11. Data tuples emitted from PE11 flow to PE12. Data tuples emitted from PE12 flow to PE15 on compute node 110F, which in turn emits tuples to be processed by sink PE16 242B.

Still further, this example operator graph shows data tuples flowing from PE3 to PE13 on compute node 110E, which itself shows data tuples flowing to PE14. Data tuples emitted from PE14 flow to PE15 on compute node 110F, which in turn emits tuples to be processed by sink PE16 242B.

Of note, in this example operator graph, the processing elements PE 6 and PE15 are multiple input port processing elements, i.e., PE6 has two input ports that respectively receive data tuples from PE4 and PE5, while PE15 has three input ports that respectively receive data tuples from PE9, PE12 and PE14. Thus, as mentioned above, in addition to being a sink for this example operator graph, PE6 could be configured to perform a join operation, combining tuples received from PE4 and PE5. Similarly, PE15 could be configured to perform a join operation, combining tuples received from PE9, PE12 and PE14. For security or other reasons (e.g., network bandwidth), each processing element that feeds one of the input ports of the multiple input port processing element PE15 exists on a separate compute node within the cluster. In this situation it is only possible for the multiple input port processing element PE15 to be fused with one of the processing elements PE9, PE12 and PE14 feeding PE15 data.

As such, some embodiments of the present invention provide techniques for determining how to fuse processing elements in this situation (i.e., where a multiple input port processing element, such as PE15, receives data tuples from multiple processing elements each residing on a separate compute node within the cluster) and for dynamically managing the fused multiple input port processing element. Some embodiments may monitor the amount of incoming data at the multiple input ports from each of the upstream processing elements (e.g., the amount of incoming data at the respective input ports of the multiple input port processing element PE15 from each of the upstream processing elements PE9, PE12 and PE14) or the amount of network bandwidth (e.g., for each of the compute nodes 110C, 110D and 110E on which the upstream processing elements PE9, PE12 and PE14 reside, the network bandwidth may be monitored at the network interface card (NIC)) to determine which one of the upstream processing elements (or operator(s) thereof) to fuse with the multiple input port processing element. For example, the multiple input port element PE15 may be fused to one of the upstream processing elements (e.g., PE9) based on the monitored data rates. Some embodiments provide a dynamic fusing capability, wherein the multiple input port processing element is fused to different ones of the upstream processing elements at run time as the monitored data rates change. For example, the dynamic fusing capability may enable the multiple input port processing element PE15 that is currently fused to one of the upstream processing elements (e.g., PE9) to be instead fused to one of the other upstream processing elements (e.g., PE12 or PE14) at run time as the monitored rates change.

Figure 3:
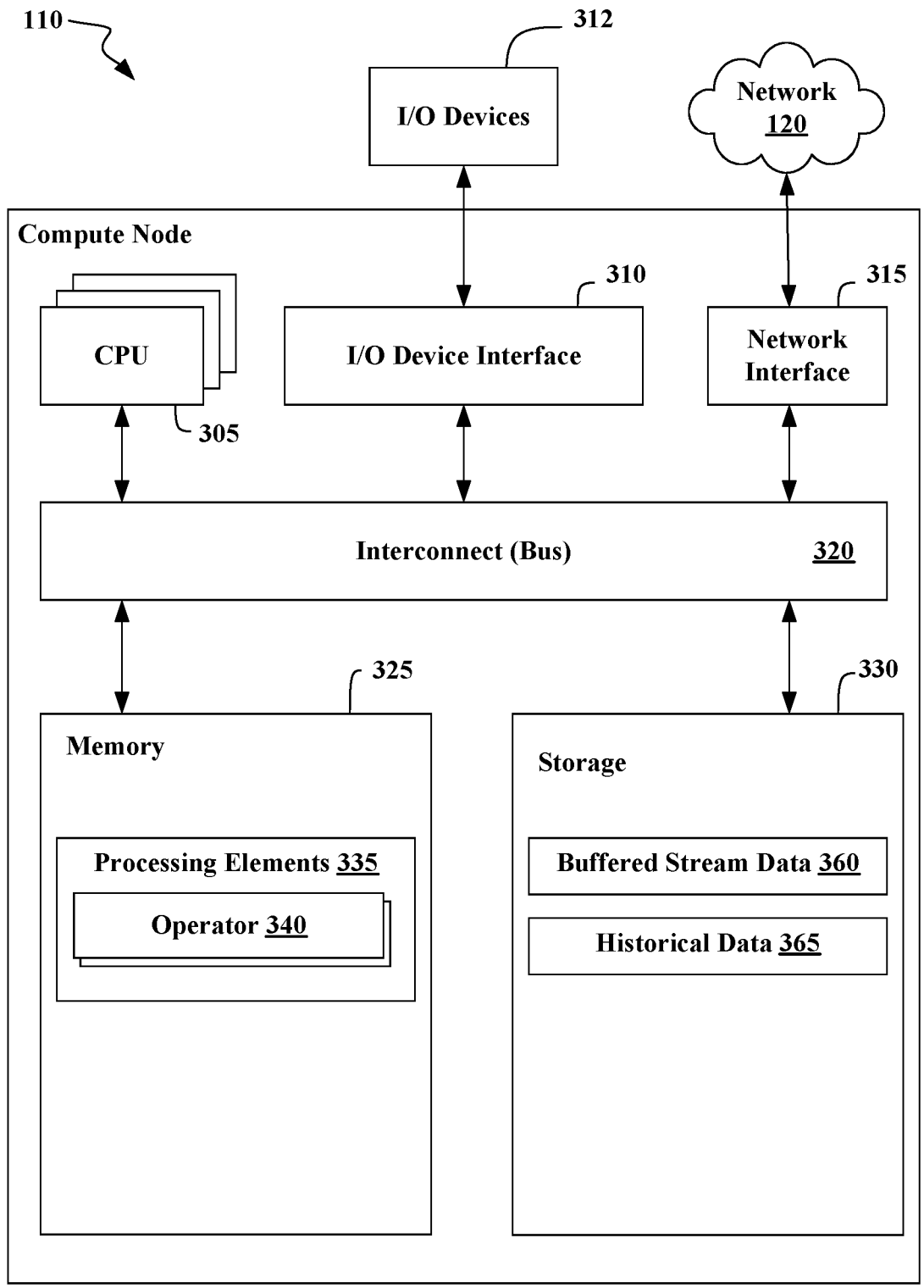
FIG. 3 is a more detailed view of the compute node of FIGS. 1 and 2, according to some embodiments of the present invention.

FIG. 3 is a more detailed view of the compute node 110 of FIGS. 1 and 2, according to some embodiments of the present invention. As shown, the compute node 110 includes, without limitation, at least one CPU 305, a network interface 315, an interconnect 320, a memory 325 and storage 330. The compute node 130 may also include an I/O device interface 310 used to connect I/O devices 312 (e.g., keyboard, display and mouse devices) to the compute node 110.

Each CPU 305 retrieves and executes programming instructions stored in the memory 325 and storage 330. Similarly, the CPU 305 stores and retrieves application data residing in the memory 325 and storage 330. The interconnect 320 is used to transmit programming instructions and application data between each CPU 305, I/O device interface 310, network interface 315, memory 325 and storage 330. CPU 305 is included to be representative of a single CPU, multiple CPUs, a single CPU having multiple processing cores, and the like. In some embodiments, a processing element (PE) 335 is assigned to be executed by only one CPU 305 although in other embodiments the operators 340 of a PE 335 may comprise one or more threads that are executed on a plurality of CPUs 305. The memory 325 is generally included to be representative of a random access memory (e.g., DRAM or Flash). Storage 330, such as a hard disk drive, solid state disk (SSD), or flash memory storage drive, may store non-volatile data.

In this example, the memory 325 includes a plurality of processing elements 335. The processing elements 335 include a collection of operators 340. As noted above, each operator 340 may provide a small chunk of code configured to process data flowing into a processing element (e.g., PE 335) and to emit data to other operators 340 in that PE and to other processing elements in the stream computing application. In the context of the present disclosure, a plurality of operators 340 may be fused in a processing element 335, such that all of the operators 340 are encapsulated in a single process running on the compute node 110. For example, each operator 340 could be implemented as a separate thread, such that all of the operators 340 can be run in parallel within a single process. The processing elements may be on the same compute node 110 or on other compute nodes accessible over the data communications network 120. Memory 325 may also contain stream connection data (not shown) which represents the connections between PEs on compute node 110 (e.g., a TCP/IP socket connection between two separate PEs 335), as well as connections to other compute nodes 110 with upstream and/or downstream PEs in the stream computing application, also via TCP/IP sockets (or other inter-process data communication mechanisms).

As shown, storage 330 contains buffered stream data 360 and historical data 365. The buffered stream data 360 represents a storage space for data flowing into the compute node 110 from upstream processing elements (or from a data source for the stream computing application). For example, buffered stream data 360 may include data tuples waiting to be processed by one of the PEs 335—i.e., a buffer. Buffered stream data 360 may also store the results of data processing performed by processing elements 335 that will be sent to downstream processing elements. For example, a PE 335 may have to store tuples intended for a downstream PE 335 if that PE 335 already has a full buffer, which may occur when the operator graph is experiencing backpressure. Storage may also contain historical data 365, which represents previous output values from the various processing elements 335 in the stream computing application. Such historical data 365 could be used, for instance, to determine a substitute output for a particular PE 335 which could be used as output for the PE 335 instead of the normal output from the PE 335 processing current input values. Such substitute output can be, for example, the average of a plurality of previously computed output values or the output value that corresponds to a particular input value received by the PE 335. Additionally, the historical data 365 may specify execution characteristics of the processing elements 335 across the node 110 or other nodes within the stream computing environment. Such characteristics may include workload information such as CPU usage, memory usage and network usage, as well as system information describing the node on which the respective processing element 335 was executed (e.g., type of CPU, number of CPUs, type of memory, amount of memory, amount of storage, network connectivity, installed applications, etc.). In accordance with some embodiments of the present invention, the historical data 365 (e.g., network usage data, such as network utilization rates) may be utilized in the context of a dynamic fusing capability that, for example, monitors the data rates for patterns and trends.

Figure 4:
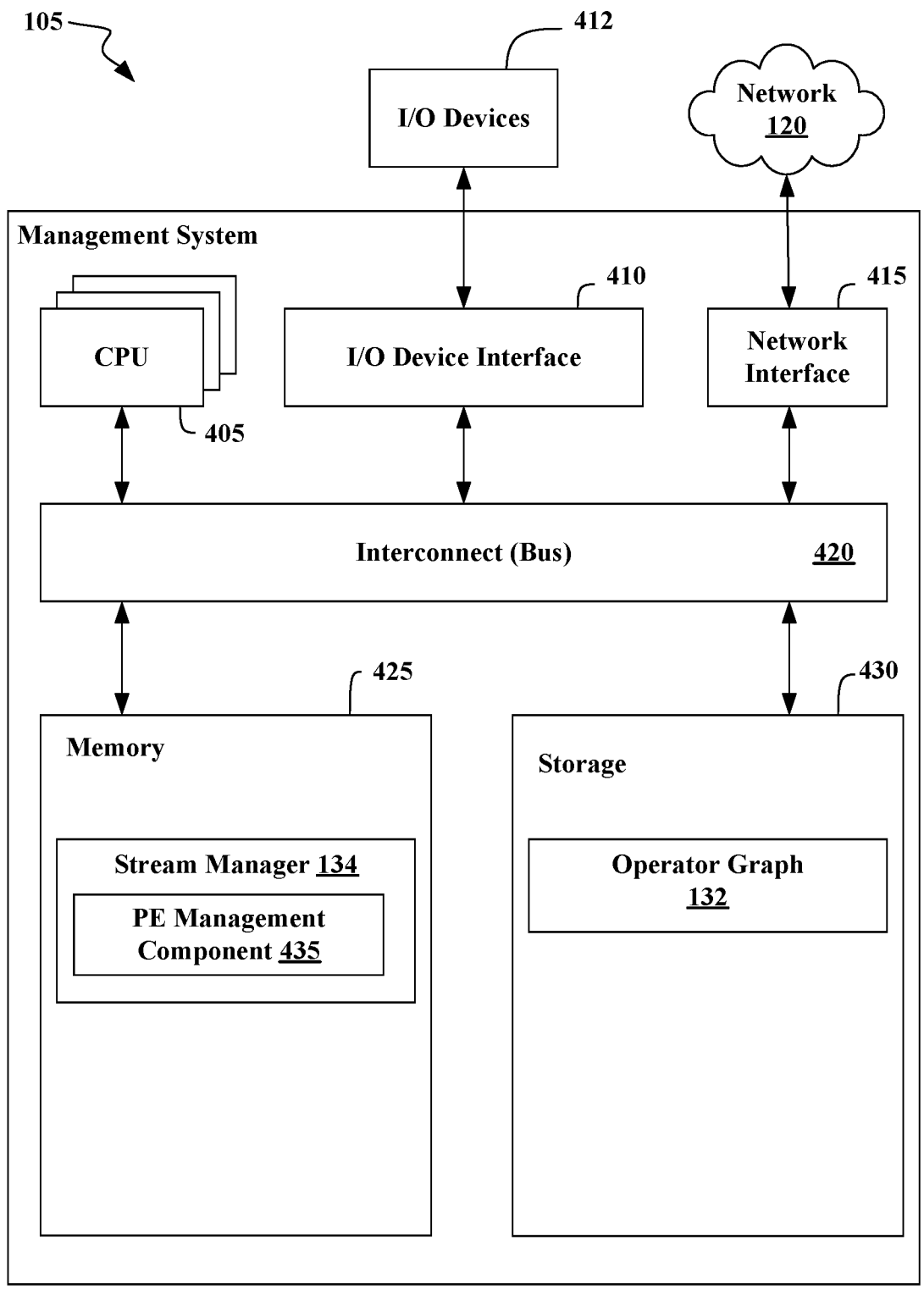
FIG. 4 is a more detailed view of the management system of FIG. 1, according to some embodiments of the present invention.

FIG. 4 is a more detailed view of the management system 105 of FIG. 1, according to some embodiments of the present invention. As shown, management system 105 includes, without limitation, a CPU 405, a network interface 415, an interconnect 420, a memory 425 and storage 430. The management system 105 may also include an I/O device interface 410 connecting I/O devices 412 (e.g., keyboard, display and mouse devices) to the management system 105.

Like CPU 305 of FIG. 3, CPU 405 is configured to retrieve and execute programming instructions stored in the memory 425 and storage 430. Similarly, the CPU 405 is configured to store and retrieve application data residing in the memory 425 and storage 430. The interconnect 420 is configured to move data, such as programming instructions and application data, between the CPU 405, I/O device interface 410, network interface 415, memory 425 and storage 430. Like CPU 305, CPU 405 is included to be representative of a single CPU, multiple CPUs, a single CPU having multiple processing cores, and the like. Memory 425 is generally included to be representative of a random access memory. The network interface 415 is configured to transmit data via the communications network 120. Although shown as a single unit, the storage 430 may be a combination of fixed and/or removable storage devices, such as fixed disc drives, removable memory cards, optical storage, SSD or flash memory devices, network attached storage (NAS), or connections to storage area-network (SAN) devices.

As shown, the memory 425 stores a stream manager 134. Additionally, the storage 430 includes an operator graph 132. The stream manager 134 may use the operator graph 132 to route tuples to PEs 335 (shown in FIG. 3) for processing. The stream manager 134 is configured with a PE management component 435. Generally, the PE management component 435 is configured to monitor data rates associated with a multiple input port processing element (e.g., PE15 shown in FIG. 2) that receives tuple data from a plurality of upstream processing elements that each reside on a separate compute node. For instance, the PE management component 435 could monitor the incoming data (or tuple) rate between each of the upstream processing elements and the multiple input port processing element. As another example, the PE management component 435 could monitor network usage data of the processing element 335 and could determine that, based on the monitored network usage rate, a pattern or trend exists that warrants a change in the "fusing partner" of an multiple input port processing element (i.e., the particular one of the upstream processing elements (or operator(s) thereof) with which the multiple input port processing element is fused).

The data rate used to select a particular upstream processing element (or operator(s) thereof) to be fused into the multiple input port processing element may be either an ingress data rate (i.e., data flowing into a processing element or operator) or an egress data rate (i.e., data flowing out of a processing element or operator). In one embodiment, the data rate may be the number of tuples that flow into, or out of, the processing element during a defined period of time, or the average number of tuples during a plurality of periods of time. In other embodiments, the data rate may be based on the data flowing into a sub-portion of the operators within a processing element. Alternatively, the data rate may be a combination of data rates flowing into multiple processing elements. In another alternative, the data rate could be a ratio between the data flowing in and the data flowing out of a processing element or operator.

Upon determining that a particular upstream processing element (or operator(s) thereof) is to be fused into the multiple input port processing element, the PE management component 435 may, for example, select for removal one or more operators from among the operator(s) within the upstream processing element. For example, the PE management component 435 could determine which of the operators of the upstream processing element output data to the multiple input port processing element and could select those operator(s) for removal. That is, by removing the operator(s) that output data to the multiple input port processing element, the PE management component 435 may fuse those operator(s) with the one or more operators of the multiple input port processing element, without disrupting the other operator(s) of the upstream processing element. Advantageously, doing so allows for dynamic fusing without interrupting all of the operators within the upstream processing element.

For example, consider a scenario where the PE management component 435 detects a particular upstream processing element is supplying data to a multiple input port processing element above a threshold data rate (e.g., the data rate of incoming data supplied to the multiple input port processing element from that particular upstream processing element may be approaching capacity, or may be greater than the data rate of each of the other upstream processing elements that are also supplying data to the multiple input port processing element). Ordinarily, this particular upstream processing element may need to be restarted or otherwise taken offline to correct this issue. However, such actions would disrupt the processing of each operator within this particular upstream processing element. This in turn may affect other operators within the stream computing application (e.g., operators that are upstream and downstream from the operators within this particular upstream processing element). However, embodiments described herein may selectively remove only a sub-portion of the operators from this particular upstream processing element, thereby allowing the remaining operators to continue their processing uninterrupted. The removed operator(s) are fused into the multiple input port processing element. Advantageously, doing so minimizes the impact of a problem arising in this particular upstream processing element (or a problem arising in any of the other upstream processing elements feeding data the multiple input port processing element) on the stream application as a whole. Fusing, at least temporarily, the removed operator(s) into the multiple input port processing element may be advantageous because the removed operator(s) are allowed to share a common process space with the operator(s) of the multiple input port processing element, resulting in much faster communication between operators than is available using inter-process communication techniques (e.g., using a TCP/IP socket).

In some embodiments, the PE management component 435 is configured to determine which of the operator(s) contained in the selected upstream processing element transmit data to the multiple input port processing element and to select for redeployment all of those operator(s) based on this determination. For example, consider an upstream processing element having several fused operators, two of which transmit data to one or more operators contained in a multiple input port processing element. The PE management component 435 may select this particular upstream processing element because, for example, it has satisfied a data rate threshold condition or has the highest relative PE-to-PE data flow rate (i.e., upstream processing element to multiple input port processing element) among the upstream processing elements transmitting data to the multiple input port processing element. In such a scenario, the PE management component 435 may select the two transmitting operators for redeployment from the selected upstream processing element to the multiple input port processing element. The PE management component 435 may then remove the selected operators from the selected upstream processing element and redeploy the selected operators into the multiple input port processing element. For instance, in an embodiment where each of the fused operators runs in a separate thread within the selected processing element process, the PE management component 435 could terminate the thread associated with the selected operators. Advantageously, doing so enables the stream computing application to selectively remove transmitting operators within a processing element that has satisfied a data rate threshold condition or has the highest relative PE-to-PE data flow rate, while allowing other operators within that processing element to continue their processing uninterrupted.

In other embodiments, the PE management component 435 is configured to determine which of the operator(s) contained in the selected upstream processing element that transmit data to the multiple input port processing element have satisfied a data rate threshold condition and to select for redeployment all of those operator(s) based on this determination. For example, consider an upstream processing element having several fused operators, two of which transmit data to one or more operators contained in a multiple input port processing element. The PE management component 435 may select this particular upstream processing element because, for example, it has the highest relative PE-to-PE data flow rate (i.e., data transmitted from the upstream processing element to the multiple input port processing element) among the upstream processing elements transmitting data to the multiple input port processing element or has satisfied a data rate threshold condition. In this example, one of the two transmitting operators is problematic as it has met a data rate threshold condition, while the other one of the two transmitting operators is not problematic as it has not met a data rate threshold condition. In such a scenario, the PE management component 435 may determine that only one of the two transmitting operators is problematic by monitoring operator-to-operator data flow rates (i.e., data transmitted from each of the two transmitting operators to one or more operators contained in the multiple input port processing element) and to select only the problematic one of the two transmitting operators for redeployment from the selected upstream processing element to the multiple input port processing element. The PE management component 435 may then remove the selected operator from the selected upstream processing element and redeploy the selected operator into the multiple input port processing element. For instance, in an embodiment where each of the fused operators runs in a separate thread within the selected processing element process, the PE management component 435 could terminate the thread associated with the selected operator. Advantageously, doing so enables the stream computing application to selectively remove one or more problematic transmitting operators within a processing element that has satisfied a data rate threshold condition or has the highest relative PE-to-PE data flow rate, while allowing other operators within that processing element to continue their processing uninterrupted.

Alternatively, the PE management component 435 may be configured to select for redeployment all of the operators contained in the selected upstream processing element.

Figure 5:
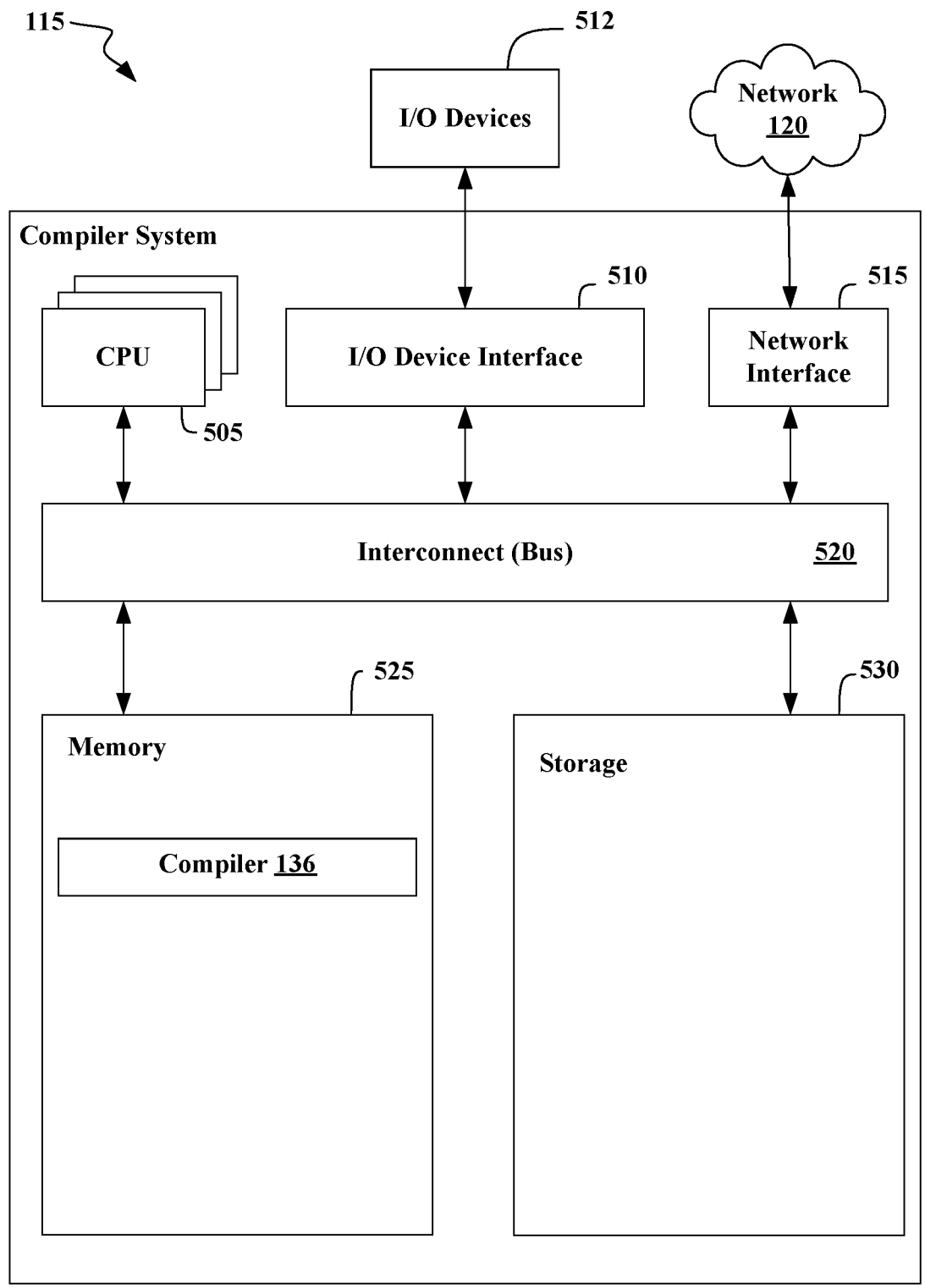
FIG. 5 is a more detailed view of the compiling system of FIG. 1, according to some embodiments of the present invention.

FIG. 5 is a more detailed view of the compiling system 115 of FIG. 1, according to some embodiments of the present invention. The compiler system 115 may include, without limitation, one or more processors (CPUs) 505, a network interface 515, an interconnect 520, a memory 525 and storage 530. The compiler system 115 may also include an I/O device interface 510 connecting I/O devices 512 (e. g., keyboard, display and mouse devices) to the compiler system 115.

Each CPU 505 retrieves and executes programming instructions stored in the memory 525 or storage 530. Similarly, each CPU 505 stores and retrieves application data residing in the memory 525 or storage 530. The interconnect 520 is used to move data, such as programming instructions and application data, between the CPU 505, I/O device interface 510, network interface 515, memory 525 and storage 530. The interconnect 520 may be one or more busses. The CPUs 505 may be a single CPU, multiple CPUs, or a single CPU having multiple processing cores in various embodiments. In one embodiment, a processor 505 may be a DSP. Memory 525 is generally included to be representative of a random access memory, e.g., SRAM, DRAM or Flash. The storage 530 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 515 is configured to transmit data via the communications network 120.

The memory 525 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In various embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 6:
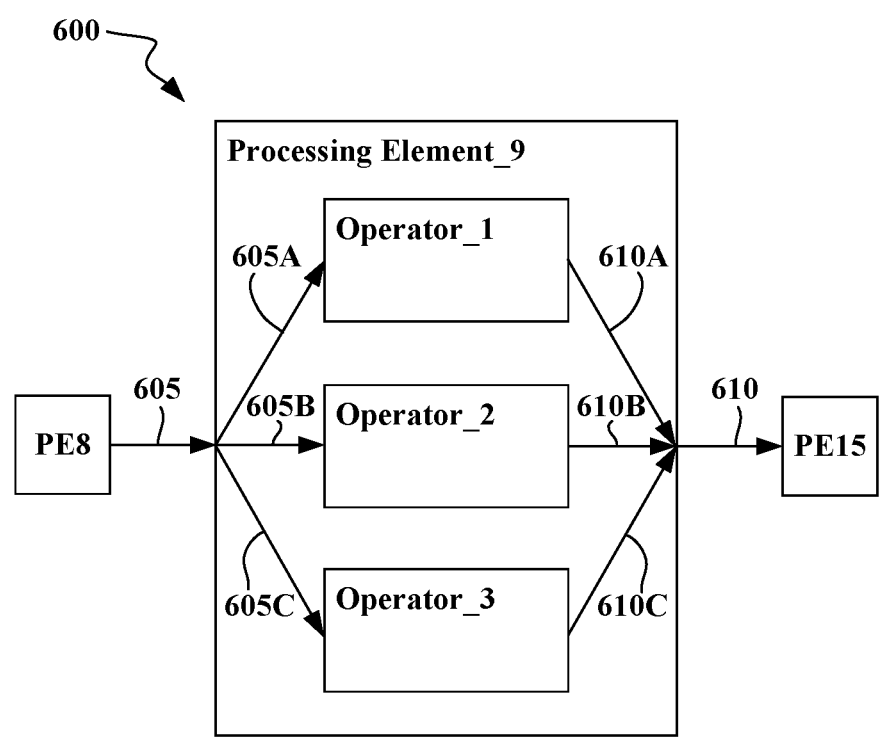
FIG. 6 illustrates a portion of the data stream of FIG. 2 where one or more operator-to-operator data flow rates may be used to select an upstream processing element (or operator(s) thereof) for redeployment, according to some embodiments of the present invention.

FIG. 6 illustrates a portion 600 of the data stream of FIG. 2 where one or more operator-to-operator data flow rates may be used to select an upstream processing element (or operator(s) thereof) for redeployment, according to some embodiments of the present invention. In data stream 600, the PE-to-PE data flow may be an abstraction of data flows between the individual operators in the operator graph. That is, one or more operators (not shown in FIG. 6) in PE8 send tuples to Operator_1, Operator_2 and Operator_3 in PE9 (denoted as "Processing Element_9" in FIG. 6) along the data paths 605A-C, collectively referred to as a PE-to-PE data path 605. Similarly, Operator_1, Operator_2 and Operator_3 in PE9 may transmit the processed tuples to operators (not shown in FIG. 6) in PE15 along the data paths 610A-C, collectively referred to as a PE-to-PE data path 610. Temporarily referring back to FIG. 2, PE9 is one of three upstream processing elements (i.e., PE9, PE12 and PE14) that transmit data to the multiple input port processing element PE15. Thus, instead of, or in addition to, monitoring based on a PE-to-PE data flow rate (i.e., a flow rate based on the combined operator-to-operator flow rates), the PE management component 435 (shown in FIG. 4) may use one or more of the operator-to-operator flow rates (e.g., the tuples flowing in data paths 605A-C and 610A-C) to select an upstream processing element (or operator(s) thereof) for redeployment.

The PE management component 435 may, for example, select upstream processing element PE9 over the other two upstream processing elements (i.e., PE12 and PE14) based on the measured PE-to-PE flow rate on data path 610 between the upstream processing element PE9 and multiple input port processing element PE15 exceeding a threshold data rate and use different flow rates to determine whether or not to redeploy operator(s) of a selected upstream processing element PE9. For example, the PE management component 435 may redeploy Operator_1 if the tuple flow rate on data path 610A is greater than 10 tuples/second, while the PE management component 435 may redeploy Operator_2 and Operator_3 if the tuple rate on data paths 610B and 610C are respectively greater than 5 tuples/second. Additionally, the PE management component 435 may rely on tuple flow rates on data paths that do not flow into the multiple input port processing element PE15. For example, the PE management component 435 may redeploy Operator_1 only if the tuple flow rate on data path 605A is above a certain threshold. Similarly, the PE management component 435 may select upstream processing element PE9 over the other two upstream processing elements (i.e., PE12 and PE14) if the measured PE-to-PE data flow rate on path 605 is above a certain threshold.

Figure 7:
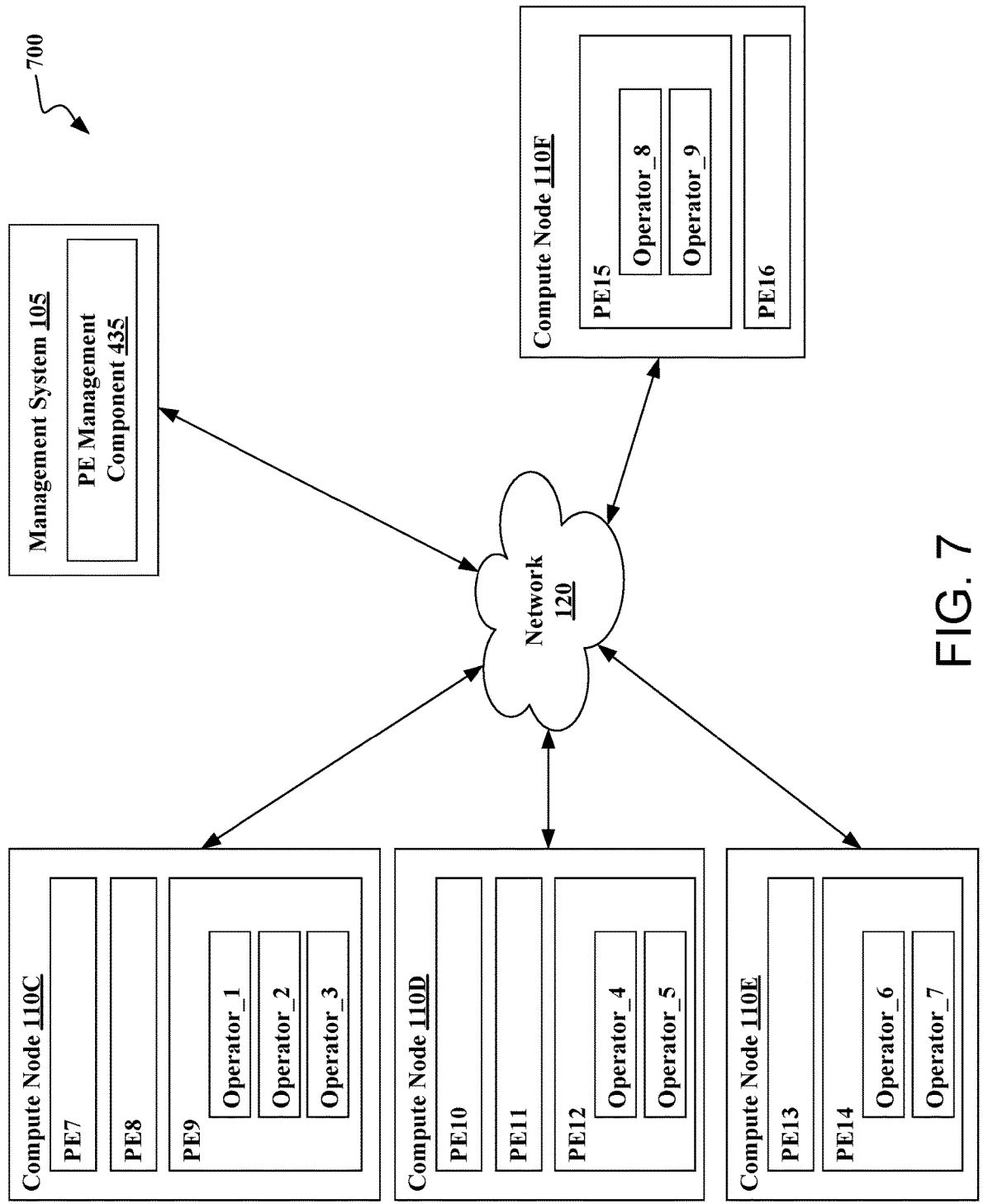
FIG. 7 is a block diagram illustrating a stream computing environment configured with a PE management component, according to some embodiments of the present invention. The stream computing environment illustrated in FIG. 7 includes a portion of the data stream of FIG. 2 in which the multiple input port processing element PE15 is configured with a plurality of fused operators and receives data from the upstream processing elements PE9, PE12 and PE14 each of which is configured with a plurality of fused operators.

FIG. 7 is a block diagram illustrating a stream computing environment configured with a PE management component, according to some embodiments of the present invention. The stream computing environment illustrated in FIG. 7 includes a portion of the data stream of FIG. 2 in which the multiple input port processing element PE15 is configured with a plurality of fused operators and receives data from the upstream processing elements PE9, PE12 and PE14, each of which is configured with a plurality of fused operators. As shown, the system 700 includes a management system 105 and four compute nodes 110C, 110D, 110E and 110F, interconnected via a network 120. As shown, the management system 105 contains a PE management component 435. As discussed above, the PE management component 435 is generally configured to detect problems arising in an upstream processing element containing a plurality of fused operators and feeding data to one of the input ports of a multiple input port processing element and to selectively remove particular ones of the fused operators in the upstream processing element.

In the depicted embodiment, the compute node 110C contains processing elements PE7, PE8 and PE9. Also in the depicted embodiment, the compute node 110D contains processing elements PE10, PE11 and PE12. In the depicted embodiment, the compute node 110E contains processing elements PE13 and PE14. Also in the depicted embodiment, the compute node 110F contains processing elements PE15 and PE16.

As best seen in FIG. 2, in the depicted embodiment, PE9, PE12 and PE14 are upstream processing elements that transmit data to the multiple input port processing element PE15. For security or other reasons (e.g., network bandwidth), each processing element (e.g., PE9, PE12 and PE14) that feeds one of the input ports of the multiple input port processing element (e.g., PE15) exists on a separate compute node (compute node 110C, compute node 110D and compute 110E) within the cluster.

In the depicted embodiment, PE9 is a fused upstream processing element, which contains three operators (i.e., Operator_1, Operator_2 and Operator_3). Also in the depicted embodiment, PE12 is a fused upstream processing element, which contains two operators (i.e., Operator_4 and Operator_5). In the depicted embodiment, PE14 is a fused upstream processing element, which contains two operators (i.e., Operator_6 and Operator_7). Also in the depicted embodiment, PE15 is a fused multiple input port processing element, which contains two operators (i.e., Operator_8 and Operator_9).

As discussed above, a plurality of operators (e.g., Operator_1, Operator_2 and Operator_3) may be fused, such that the operators are contained within a single process (e.g., fused PE9). For instance, each of Operator_1, Operator_2 and Operator_3 could be implemented to run in one or more threads within PE9. Advantageously, by fusing the operators into a single process, Operator_1, Operator_2 and Operator_3 may communicate with one another very efficiently and without requiring any form of "transport" (e.g., a network socket, a TCP/IP socket, or shared memory). That is, when processes are fused together, the fused processing elements can use more rapid communication techniques for passing tuples (or other data) among the operators within a processing element.

However, because Operator_1, Operator_2 and Operator_3 reside within a single process (i.e., PE9), Operator_1, Operator_2 and Operator_3 will all be terminated when the PE9 is terminated. As such, an error from one of the operators (e.g., Operator_1) can potentially bring the other operators (e.g., Operator_2 and Operator_3) within PE9 offline, even though the other operators (e.g., Operator 2 and Operator_3) did not experience any errors. Of note, although three operators (i.e., Operator_1, Operator_2 and Operator_3) are shown within PE9, such a depiction is without limitation and for illustrative purposes only. More generally, a processing element may contain any number of fused operators and these problems are more pronounced in embodiments where a processing element contains a substantial number of fused operators. That is, the more operators contained within a processing element, the greater the chance that one of the operators will experience an error and potentially bring all of the fused operators offline.

Accordingly, embodiments described herein provide techniques for managing execution of an upstream processing element feeding data to a multiple input port processing element and containing a plurality of fused operators. In some embodiment, the PE management component 435 could monitor the relative data flow rates of each of the upstream processing elements (i.e., PE9, PE12 and PE14) feeding data to the multiple input port processing element PE15 and select the upstream processing element having the highest relative data flow rate (i.e., the upstream processing element having highest PE-to-PE data flow rate to the multiple input port processing element PE15 relative to the PE-to-PE data flow rates of the other upstream processing elements to the multiple input port processing element PE15). Alternatively, the PE management component 435 could monitor the relative data flow rates of each of the upstream processing elements (i.e., PE9, PE12 and PE14) feeding data to the multiple input port processing element PE15 and proactively select the upstream processing element predicted to have the highest PE-to-PE data flow rate based on, for example, the recognition of a temporal pattern in historical data (i.e., PE-to-PE data flow rates) or the observation of a high rate of increase in a PE-to-PE data flow rate. In other embodiments, the PE management component 435 could monitor the data flow rates of each of the upstream processing elements (i.e., PE9, PE12 and PE14) feeding data to the multiple input port processing element PE15 in order to detect when a data rate threshold condition has been satisfied by one or more of the upstream processing elements.

One example of such a data rate threshold condition could be when the PE management component 435 detects that the network bandwidth usage of one or more of the upstream processing elements exceeds a threshold amount of network bandwidth. For instance, the PE management component 435 may detect that the PE-to-PE data flow rate from the upstream processing element PE9 to the multiple input port processing element PE15 exceeds a certain threshold.

Another example of such a data rate threshold condition could be when the PE management component 435 detects that the network bandwidth usage of one or more of the operators in one or more of the upstream processing elements exceeds a threshold amount of network bandwidth. For instance, the PE management component 435 may detect that the operator-to-operator data flow rate from Operator_1 in the upstream processing element PE9 to Operator_8 in the multiple input port processing element PE15 and/or the operator-to-operator data flow rate from Operator_1 in the upstream processing element PE9 to Operator_9 in the multiple input port processing element PE15 exceed a certain threshold.

Yet another example of such data rate threshold condition could be when the PE management component 435 detects that one or more of the upstream processing elements (or operator(s) thereof) are using substantially more network bandwidth (i.e., network bandwidth used in transmitting data from a particular upstream processing element (or operator(s) thereof) to the multiple input port processing element PE15) than the one or more upstream processing elements (or operator(s) thereof) have historically used.

If the PE management component 435 detects that a data rate threshold condition has been satisfied by more than one upstream processing element, the PE management component 435 could select the upstream processing element that exceeds the data rate threshold condition by the greatest percentage.

Upon detecting that the upstream processing element PE9, for example, has the highest relative data flow rate, is predicted to have the highest relative data flow rate, or has satisfied a data rate threshold condition, the PE management component 435 may select at least one of the fused operators (i.e., Operator_1, Operator_2 and/or Operator_3) from the upstream processing element PE9 for redeployment from the upstream processing element PE9 into the multiple input port processing element PE15. In one embodiment, the PE management component 435 is configured to determine which of the fused operators caused the data rate threshold condition to be satisfied. For example, the PE management component 435 may detect that only the operator-to-operator data flow rate(s) from Operator_1 in the upstream processing element PE9 to Operator_8 and/or to Operator_9 in the multiple input port processing element PE15 exceed a certain threshold. The PE management component 435 could then select for redeployment only Operator_1. In another embodiment, the PE management component 435 is configured to identify which of the fused operators transmit data to the multiple input port processing element PE15. The PE management component 435 could then select for redeployment all of the fused operators in the upstream processing element PE9 that transmit data to the multiple input port processing element PE15. In yet another embodiment, the PE management component 435 may be configured to select for redeployment all of the fused operators in the upstream processing element PE9.

The PE management component 435 may then remove the selected at least one fused operator from the selected upstream processing element. For instance, upon selecting Operator_1 for redeployment from the upstream processing element PE9, the PE management component 435 could remove Operator_1 from the upstream processing element PE9. As an example, in an embodiment where each of Operator_1, Operator_2 and Operator_3 is implemented using one or more threads within the process for the upstream processing element PE9, the PE management component 435 could terminate the thread(s) associated with the selected Operator_1. Advantageously, doing so allows the PE management component 435 to selectively remove particular operators from an upstream processing element, without interrupting the processing of the other fused operators within the upstream processing element.

Upon removing the selected operator(s), the PE management component 435 may be configured to fuse the removed operator(s) into the multiple input port processing element. Fusing, at least temporarily, the selected operator(s) into the multiple input port processing element may be advantageous because the selected operator(s) are allowed to share a common process space with the operator(s) of the multiple input port processing element, resulting in much faster communication between operators than is available using inter-process communication techniques (e.g., using a TCP/IP socket).

The PE management component 435 may also be configured to provide a dynamic fusing capability, wherein the multiple input port processing element is fused to different ones of the upstream processing elements (or operator(s) thereof) at run time as the monitored data rates change. For example, the PE management component 435 may redeploy one or more operators currently fused into the multiple input port processing element PE15 back into a home upstream processing element (e.g., PE9) and redeploy selected operator(s) from one of the other upstream processing elements (e.g., PE12 or PE14) into the multiple input port processing element PE15 at run time as the monitored rates change.

Figure 8:
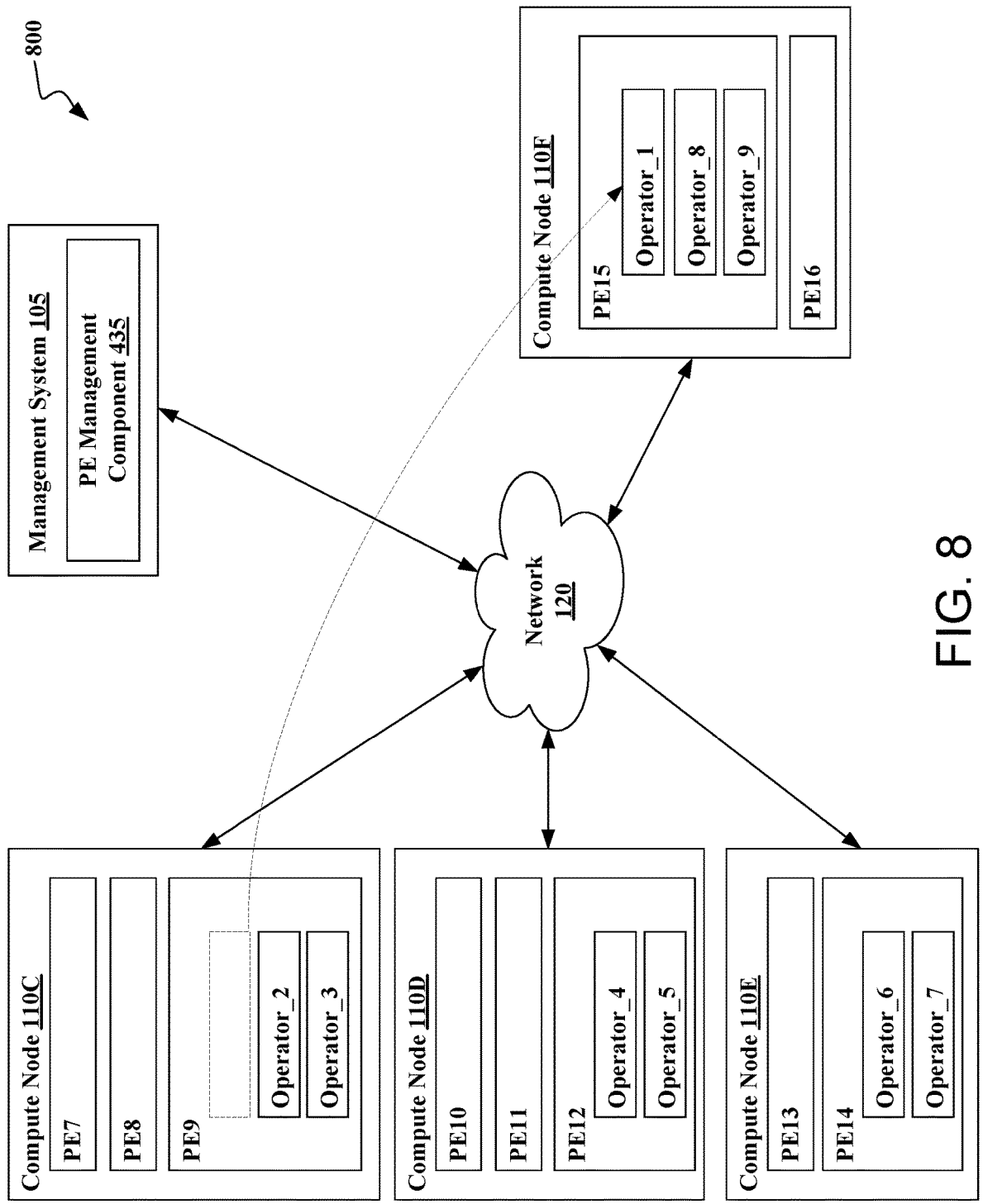
FIG. 8 is a block diagram illustrating a stream computing environment configured with a PE management component, according to some embodiments of the present invention. The stream computing environment illustrated in FIG. 8 includes a portion of the data stream of FIG. 2 in which an operator (i.e., Operator_1) from the upstream processing element PE9 is redeployed into the multiple input port processing element PE15.

An example of a redeployed operator is shown in FIG. 8, which is a block diagram illustrating a stream computing environment configured with a PE management component, according to some embodiments of the present invention. The stream computing environment illustrated in FIG. 8 includes a portion of the data stream of FIG. 2 in which an operator (i.e., Operator_1) from the upstream processing element PE9 is redeployed into the multiple input port processing element PE15.

The system 800 shown in FIG. 8 generally corresponds to the system 700 shown in FIG. 7. However, in the system 800 shown in FIG. 8, unlike the system 700 shown in FIG. 7, Operator_1 is redeployed from the upstream processing element PE9 into the multiple input port processing element PE15. This redeployment of Operator_1, which is denoted in FIG. 8 with a dashed arrow, may be performed by the PE management component 435 to remedy a detected problem associated with Operator_1. For example, the PE management component 435 may detect that Operator_1 has satisfied a data rate threshold condition. For instance, the PE management component 435 may detect that the operator-to-operator data flow rate from Operator_1 in the upstream processing element PE9 to Operator_8 in the multiple input port processing element PE15 and/or the operator-to-operator data flow rate from Operator_1 in the upstream processing element PE9 to Operator_9 in the multiple input port processing element PE15 exceed a certain threshold.

Advantageously, by fusing Operator_1, Operator_8 and Operator_9 into a single process, these operators may communicate with one another very efficiently and without requiring any form of "transport" (e.g., a network socket, a TCP/IP socket, or shared memory). That is, when processes are fused together, the fused processing elements can use more rapid communication techniques for passing tuples (or other data) among the operators within a processing element. Fusing, at least temporarily, Operator_1 in which a problem arises into the multiple input port processing element PE 15 may alleviate the problem because Operator_1, Operator_8 and Operator_9 are allowed to share a common process space, resulting in much faster communication between operators than is available using inter-process communication techniques (e.g., using a TCP/IP socket).

To accomplish the redeployment of Operator_1, the PE management component 435 may be configured to select Operator_1, remove (un-fuse) Operator_1 from the upstream processing element PE9, and fuse the removed Operator_1 into the multiple input port processing element PE15. As part of this redeployment operation, the PE management component 435 may be further configured to update the operator graph for the stream computing application to account for the redeployed Operator_1 now running within the multiple input port processing element PE15.

Figure 9:
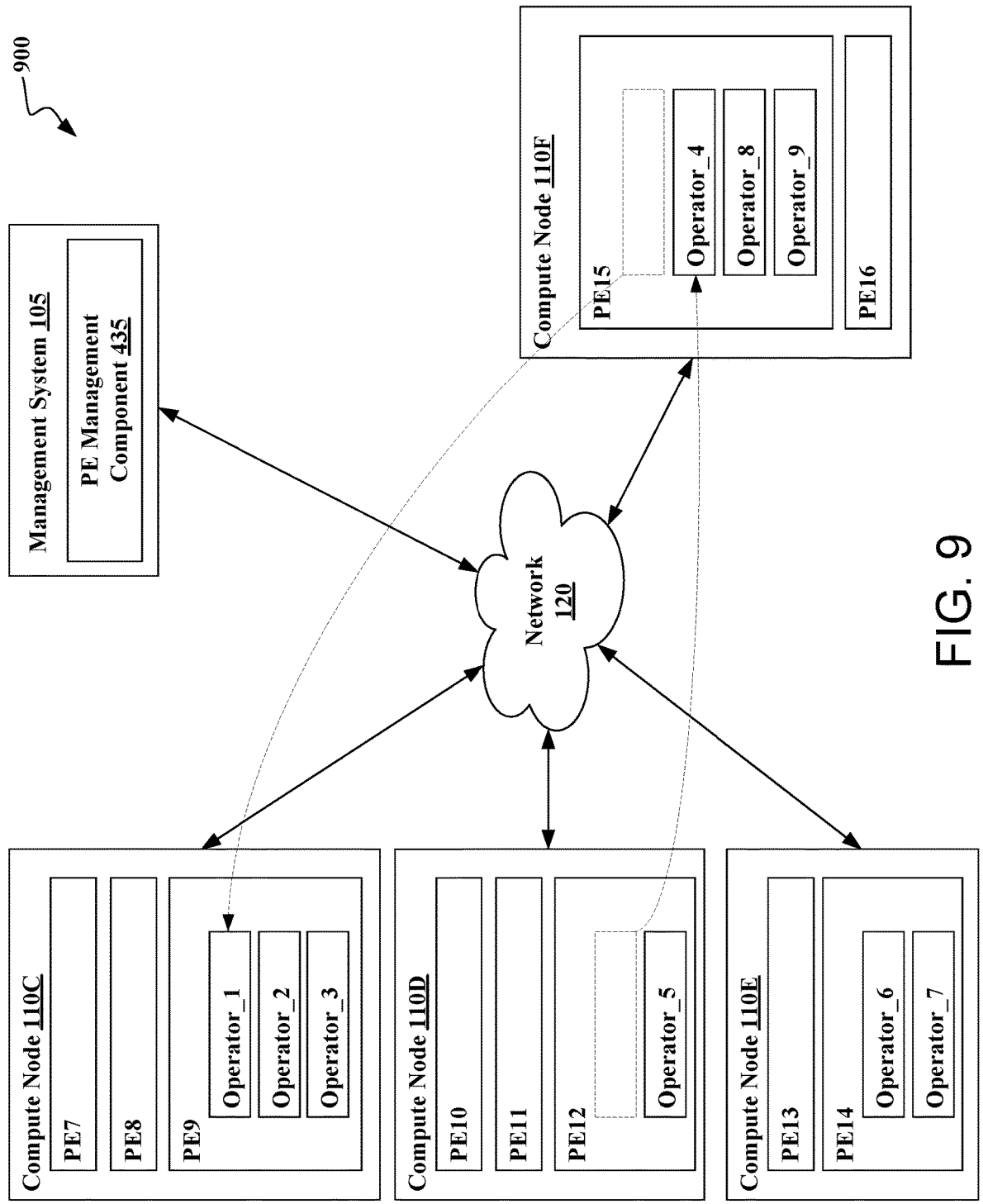
FIG. 9 is a block diagram illustrating a stream computing environment configured with a PE management component, according to some embodiments of the present invention. The stream computing environment illustrated in FIG. 9 includes a portion of the data stream of FIG. 2 in which an operator (i.e., Operator_1) from the multiple input port processing element PE15 is redeployed back into its home upstream processing element PE9 and an operator (i.e., Operator_4) from the upstream processing element PE12 is redeployed into the multiple input port processing element PE15.

An example of a dynamic fusion capability is shown in FIG. 9, which is a block diagram illustrating a stream computing environment configured with a PE management component, according to some embodiments of the present invention. The stream computing environment illustrated in FIG. 9 includes a portion of the data stream of FIG. 2 in which an operator (i.e., Operator_1) from the multiple input port processing element PE15 is redeployed back into its home upstream processing element PE9 and an operator (i.e., Operator_4) from the upstream processing element PE12 is redeployed into the multiple input port processing element PE15.

The system 900 shown in FIG. 9 generally corresponds to the system 800 shown in FIG. 8. However, in the system 900 shown in FIG. 9, unlike the system 800 shown in FIG. 8, Operator_1 is redeployed from the multiple input port processing element PE15 back into its home upstream processing element PE9, and Operator_4 is redeployed from the upstream processing element PE12 into the multiple input port processing element PE15. These redeployments of Operator_1 and Operator_4, which are denoted in FIG. 9 with dashed arrows, may be performed by the PE management component 435 to remedy a detected problem associated with Operator_4. For example, the PE management component 435 may detect that Operator_4 has satisfied a data rate threshold condition. For instance, the PE management component 435 may detect that the operator-to-operator data flow rate from Operator_4 in the upstream processing element PE9 to Operator_8 in the multiple input port processing element PE15 and/or the operator-to-operator data flow rate from Operator_4 in the upstream processing element PE9 to Operator_9 in the multiple input port processing element PE15 exceed a certain threshold.

Advantageously, by fusing Operator_4, Operator_8 and Operator_9 into a single process, these operators may communicate with one another very efficiently and without requiring any form of "transport" (e.g., a network socket, a TCP/IP socket, or shared memory). That is, when processes are fused together, the fused processing elements can use more rapid communication techniques for passing tuples (or other data) among the operators within a processing element. Fusing, at least temporarily, Operator_4 in which a problem arises into the multiple input port PE 15 may alleviate the problem because Operator_4, Operator_8 and Operator_9 are allowed to share a common process space, resulting in much faster communication between operators than is available using inter-process communication techniques (e.g., using a TCP/IP socket).

For security or other reasons (e.g., network bandwidth), each upstream processing element (i.e., PE9, PE12 and PE14) that feeds one of the input ports of the multiple input port processing element PE15 exists on a separate compute node (i.e., compute node 110C, compute node 110D and compute node 110E) within the cluster. In this situation it is only possible for the multiple input port processing element PE15 to be fused with one of the processing elements (or operator(s) thereof) feeding it data. Hence, Operator_1 (which originated from the upstream processing element PE9) must be removed from the multiple input port processing element PE15 before Operator_4 (which is to be removed from the upstream processing element PE12) can be fused into the multiple input port processing element PE15.

To accomplish the redeployment of Operator_1, the PE management component 435 may be configured to select Operator_1, remove (un-fused) Operator_1 from the multiple input port processing element PE15, and re-fuse the removed Operator_1 back into the upstream processing element PE9. To accomplish the redeployment of Operator_4, the PE management component 435 may be configured to select Operator_4, remove (un-fused) Operator_4 from the upstream processing element PE12, and fuse the removed Operator_4 into the multiple input port processing element PE15. As part of these redeployment operations, the PE management component 435 may be further configured to update the operator graph for the stream computing application to account for the redeployed Operator_1 now running within the upstream processing element PE9 and Operator_4 now running within the multiple input port processing element PE15.

In some embodiments of the present invention, upon redeploying an operator from an upstream processing element, the PE management component 435 is configured to generate a notification for the redeployed operator. For example, such a notification could specify which operator(s) were removed, the upstream processing element the operator(s) were removed from, the multiple input port processing element and compute node the operator(s) were redeployed into, and the circumstances leading to the redeployment of the operator(s) (e.g., which data rate threshold condition was satisfied). Such a notification could then be transmitted, for example, to a system administrator of the stream computing application. Advantageously, doing so allows the PE management component 435 to autonomously perform dynamic fusion changes in a multiple input port processing element upon detecting a problem (based off data flow rates) in an upstream processing element within a stream computing application, while still alerting system administrators of the stream computing application to the problem.

Figure 10:
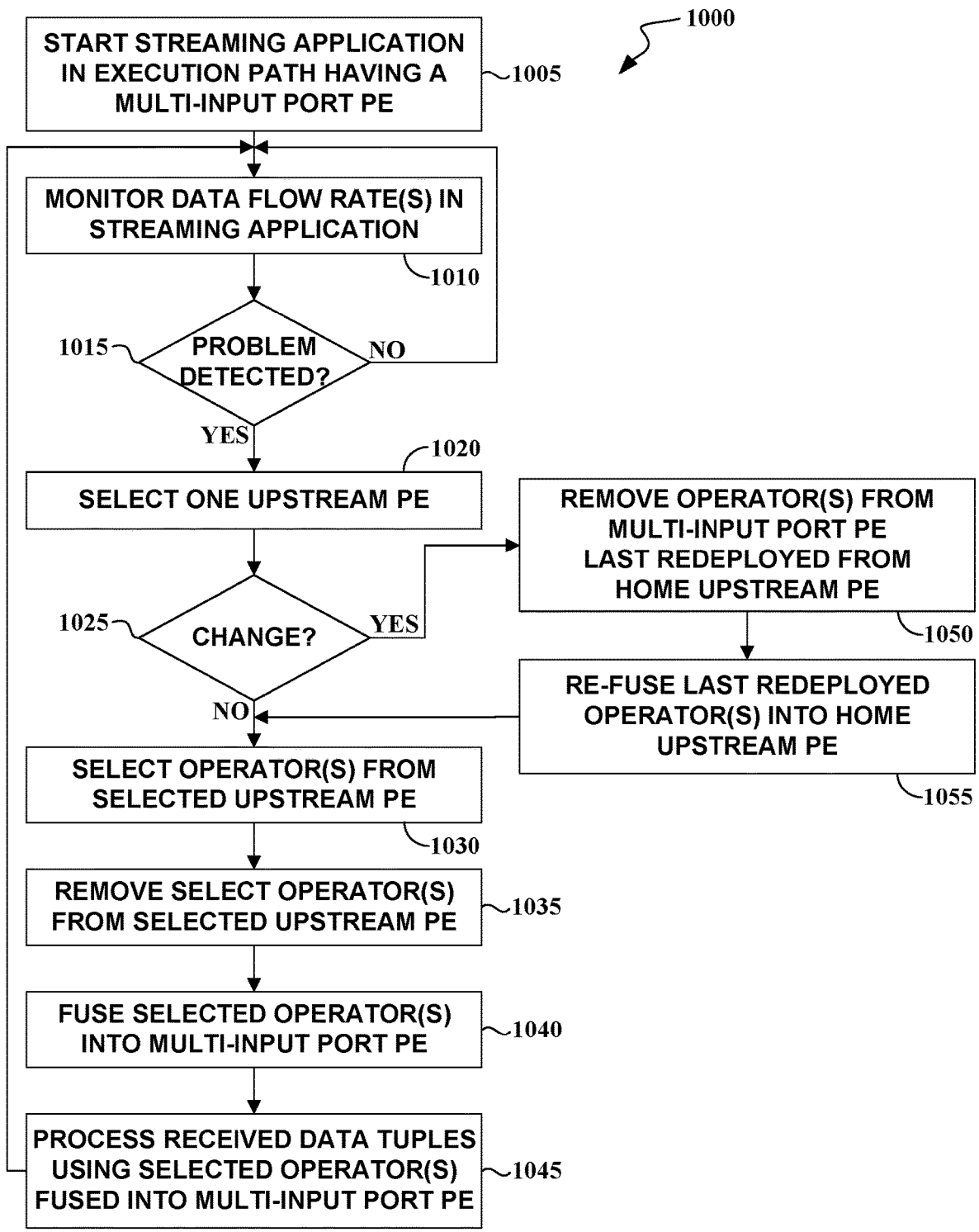
FIG. 10 is a flow diagram illustrating a method of dynamically redeploying one or more operators to a multiple input port processing element from a plurality of upstream processing elements, according to some embodiments of the present invention.

FIG. 10 is a flow diagram illustrating a method 1000 of dynamically redeploying one or more operators to a multiple input port processing element from a plurality of upstream processing elements, according to some embodiments of the present invention. The method 1000 sets forth the preferred order of the blocks. It must be understood, however, that the various blocks may occur at any time relative to one another. The method 1000 begins by starting a streaming application in an execution path having a multiple input port processing element (block 1005).

The method 1000 continues with the PE management component 435 monitoring the data flow rates associated with the upstream processing elements feeding data into the input ports of the multiple input port processing element (block 1010). For example, the PE management component 435 may monitor, for each of the upstream processing elements, a PE-to-PE data flow rate (i.e., the data flow rate from the upstream processing element to the multiple input port processing element). Additionally, the PE management component 435 may monitor, for each of the upstream processing elements, one or more operator-to-operator data flow rates (i.e., the data flow rate from each of the operators contained in the upstream processing element to one or more operators contained in the multiple input port processing element).

The method 1000 then continues with the PE management component 435 determining whether there are any problems or potential problems associated with the upstream elements feeding data into the input ports of the multiple input port processing element (block 1015). For example, the PE management component 435 may determine that a problem exists for one of the upstream processing elements upon detecting that particular upstream processing element has satisfied a data rate threshold condition. The PE management component 435 may detect, for instance, the PE-to-PE data flow rate for that particular upstream processing element exceeds a certain threshold. As another example, the PE management component 435 may determine that a potential problem exists for one of the upstream processing elements upon detecting that particular upstream processing element has the highest relative PE-to-PE data flow rate among the upstream processing elements transmitting data to the multiple input port processing element. If the PE management component 435 determines that no problem or potential problem has occurred for the upstream processing elements (block 1015=no), the method 1000 returns to block 1010, where the PE management component 435 continues monitoring the data flow rates associated with the upstream processing elements feeding data into the input ports of the multiple input port processing element.

If instead, the PE management component 435 had detected a problem or potential problem with one or more of the upstream processing elements (block 1015=yes), the PE management component 435 selects one of the upstream processing elements (block 1020). For example, the PE management component 435 may select a particular upstream processing element because, for example, it has satisfied a data rate threshold condition. The PE management component 435 may select a particular upstream processing element because, for instance, the PE-to-PE data flow rate for that particular upstream processing element exceeds a certain threshold. If the PE management component 435 detects that a data rate threshold condition has been satisfied by more than one upstream processing element, the PE management component 435 could select the upstream processing element that exceeds the data rate threshold condition by the greatest percentage. As another example, the PE management component 435 may select a particular upstream processing element because, for example, it has the highest relative PE-to-PE data flow rate (i.e., upstream processing element to multiple input port processing element) among the upstream processing elements transmitting data to the multiple input port processing element.

Next, the method 1000 continues with the PE management component 435 determining if the multiple input port processing element contains one or more operators earlier redeployed into the multiple input port processing element from another of the upstream processing elements (block 1025). If the PE management component 435 determines that the multiple input port processing element contains one or more operators earlier redeployed into the multiple input port processing element from another the upstream processing elements (i.e., a different one of the upstream processing elements than the selected upstream processing element) (block 1025=yes), the PE management component 435 selects the one or more operators for redeployment to their "home" upstream processing element, removes (un-fuses) the one or more operators from the multiple input port processing element (block 1050), and re-fuses the one or more operators into their "home" upstream processing element (block 1055). The redeployment operation performed in blocks 1050 and 1055 corresponds to the redeployment, shown in FIG. 9, of Operator_1 from the multiple input port processing element PE15 to its "home" upstream processing element PE9.

For security or other reasons (e.g., network bandwidth), each upstream processing element that feeds one of the input ports of the multiple input port processing element exists on a separate compute node within the cluster. In this situation it is only possible for the multiple input port processing element to be fused with one of the processing elements (or operator(s) thereof) feeding it data. Hence, the one or more operators earlier operators earlier redeployed into the multiple input port processing element from another of the upstream processing elements must be removed from the multiple input port processing element before any operators from the selected upstream processing element can be fused into the multiple input port processing element. The removal operation performed in block 1050 accomplishes the prerequisite removal.

When the redeployment operation performed in blocks 1050 and 1055 has been completed, or if the PE management component 435 determines that the multiple input port processing element does not contain one or more operators earlier redeployed into the multiple input port processing element from another the upstream processing elements (i.e., a different one of the upstream processing elements than the selected upstream processing element) (block 1025=no), the PE management component 435 selects one or more operators from the selected upstream processing element for redeployment to the multiple input port processing element (block 1030). For example, the PE management component 435 may be configured to determine which of the operator(s) contained in the selected upstream processing element transmit data to the multiple input port processing element and to select for redeployment all of those transmitting operator(s). As another example, the PE management component 435 may be configured to determine which of the operator(s) contained in the selected upstream processing element that transmit data to the multiple input port processing element have also satisfied a data rate threshold condition and to select for redeployment only those transmitting operator(s) that have satisfied the data rate threshold condition. Alternatively, the PE management component 435 may be configured to select for redeployment all of the operators contained in the selected upstream processing element.

Once the PE management component 435 has selected one or more operators from the selected upstream processing element for redeployment to the multiple input port processing element, the PE management component 435 then removes (un-fuses) the selected one or more operators from the selected upstream processing element (block 1035) and fuses the selected one or more operators into the multiple input port processing element (block 1040). The redeployment operation performed in blocks 1035 and 1040 corresponds to the redeployment, shown in FIG. 8, of Operator_1 from the upstream processing element PE9 to the multiple input port processing element PE15, as well as to the redeployment, shown in FIG. 9, of Operator_4 from the upstream processing element PE12 to the multiple input port processing element PE15.

The method 1000 then continues by processing received data tuples using the selected one or more operators fused into the multiple input port processing element (block 1045). Then, the method 1000 returns to block 1010, where the PE management component 435 continues monitoring the data flow rates associated with the upstream processing elements feeding data into the input ports of the multiple input port processing element.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to some embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments of the present invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

One skilled in the art will appreciate that many variations are possible within the scope of the present invention. For example, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, some embodiments of the present invention may be configured to operate in a clustered environment with a standard database processing application. Thus, while the present invention has been particularly shown and described with reference to particular embodiments thereof, it will be understood by those skilled in the art that these and other changes in form and detail may be made therein without departing from the spirit and scope of the present invention.

What is claimed is:

1. A method of managing processing elements, the method comprising:
   receiving streaming data to be processed by a plurality of interconnected processing elements, each processing element comprising one or more operators that process at least a portion of the received data, wherein one of the processing elements is a multiple input port processing element configured to receive data directly from at least two upstream processing elements, wherein each of the at least two upstream processing elements resides on a separate compute node, and wherein, at any one time, the multiple input port processing element is permitted to be fused with no more than one of the at least two upstream processing elements or the one or more operators thereof;
   measuring a data flow rate in a data path between at least two components in the plurality of processing elements;
   selecting one of the at least two upstream processing elements based on the measured data flow rate;
   determining if the multiple input port processing element contains one or more operators earlier redeployed into the multiple input port processing element from another of the at least two upstream processing elements;
   upon determining the multiple input port processing element contains one or more operators earlier redeployed into the multiple input port processing element from another of the at least two upstream processing elements, redeploying the one or more operators back to the another of the at least two upstream processing elements, wherein redeploying the one or more operators back to the another of the at least two upstream processing elements comprises:
      un-fusing the one or more operators from the multiple input port processing element;
      re-fusing the one or more operators into the another of the at least two upstream processing elements;
   redeploying at least one operator from the selected one of the at least two upstream processing elements to the multiple input port processing element, wherein redeploying at least one operator from the selected one of the at least two upstream processing elements to the multiple input port processing element comprises fusing the at least one operator into the multiple input port processing element.

2. The method as recited in claim 1, wherein redeploying at least one operator from the selected one of the at least two upstream processing elements to the multiple input port processing element comprises:
   selecting the at least one operator from among a plurality of operators fused together in the selected one of the at least two upstream processing elements;
   un-fusing the at least one operator from the selected one of the at least two upstream processing elements;
   fusing the at least one operator into the multiple input port processing element.

3. The method as recited in claim 1, wherein measuring a data flow rate in a data path between at least two components in the plurality of processing elements comprises measuring an amount of incoming data per unit time received by the multiple input port processing element from each of the at least two upstream processing elements, and wherein selecting one of the at least two upstream processing elements based on the measured data flow rate comprises detecting that one of the at least two upstream processing elements has the highest relative data flow rate, is predicted to have the highest relative data flow rate, or has satisfied a data rate threshold condition.

4. The method as recited in claim 1, wherein measuring a data flow rate in a data path between at least two components in the plurality of processing elements comprises measuring an amount of incoming data per unit time received by one or more operators contained in the multiple input port processing element from one or more operators contained in each of the at least two upstream processing elements.

5. The method as recited in claim 1, wherein measuring a data flow rate in a data path between at least two components in the plurality of processing elements comprises measuring an amount of network bandwidth.

6. A system, comprising:
   at least one processor;
   a memory coupled to the at least one processor and containing a program that, when executed by the at least one processor, performs a method comprising:
      receiving streaming data to be processed by a plurality of interconnected processing elements, each processing element comprising one or more operators that process at least a portion of the received data, wherein one of the processing elements is a multiple input port processing element configured to receive data directly from at least two upstream processing elements, wherein each of the at least two upstream processing elements resides on a separate compute node, and wherein, at any one time, the multiple input port processing element is permitted to be fused with no more than one of the at least two upstream processing elements or the one or more operators thereof;
      measuring a data flow rate in a data path between at least two components in the plurality of processing elements;
      selecting one of the at least two upstream processing elements based on the measured data flow rate;
      determining if the multiple input port processing element contains one or more operators earlier redeployed into the multiple input port processing element from another of the at least two upstream processing elements;
      upon determining the multiple input port processing element contains one or more operators earlier redeployed into the multiple input port processing element from another of the at least two upstream processing elements, redeploying the one or more operators back to the another of the at least two upstream processing elements, wherein redeploying the one or more operators back to the another of the at least two upstream processing elements comprises:
  un-fusing the one or more operators from the multiple input port processing element;
  re-fusing the one or more operators into the another of the at least two upstream processing elements;
  redeploying at least one operator from the selected one of the at least two upstream processing elements to the multiple input port processing element, wherein redeploying at least one operator from the selected one of the at least two upstream processing elements to the multiple input port processing element comprises fusing the at least one operator into the multiple input port processing element.

7. The system as recited in claim 6, wherein redeploying at least one operator from the selected one of the at least two upstream processing elements to the multiple input port processing element comprises:
  selecting the at least one operator from among a plurality of operators fused together in the selected one of the at least two upstream processing elements;
  un-fusing the at least one operator from the selected one of the at least two upstream processing elements;
  fusing the at least one operator into the multiple input port processing element.

8. The system as recited in claim 6, wherein measuring a data flow rate in a data path between at least two components in the plurality of processing elements comprises measuring an amount of incoming data per unit time received by the multiple input port processing element from each of the at least two upstream processing elements, and wherein selecting one of the at least two upstream processing elements based on the measured data flow rate comprises detecting that one of the at least two upstream processing elements has the highest relative data flow rate, is predicted to have the highest relative data flow rate, or has satisfied a data rate threshold condition.

9. The system as recited in claim 6, wherein measuring a data flow rate in a data path between at least two components in the plurality of processing elements comprises measuring an amount of incoming data per unit time received by one or more operators contained in the multiple input port processing element from one or more operators contained in each of the at least two upstream processing elements.

10. The system as recited in claim 6, wherein measuring a data flow rate in a data path between at least two components in the plurality of processing elements comprises measuring an amount of network bandwidth.

11. A computer program product for managing processing elements, the computer program product comprising a computer readable storage medium having program code embodied therewith, the program code executable by a processor to perform a method comprising:
  receiving streaming data to be processed by a plurality of interconnected processing elements, each processing element comprising one or more operators that process at least a portion of the received data, wherein one of the processing elements is a multiple input port processing element configured to receive data directly from at least two upstream processing elements, wherein each of the at least two upstream processing elements resides on a separate compute node, and wherein, at any one time, the multiple input port processing element is permitted to be fused with no more than one of the at least two upstream processing elements or the one or more operators thereof;
  measuring a data flow rate in a data path between at least two component in the plurality of processing elements;
  selecting one of the at least two upstream processing elements based on the measured data flow rate;
  determining if the multiple input port processing element contains one or more operators earlier redeployed into the multiple input port processing element from another of the at least two upstream processing elements;
  upon determining the multiple input port processing element contains one or more operators earlier redeployed into the multiple input port processing element from another of the at least two upstream processing elements, redeploying the one or more operators back to the another of the at least two upstream processing elements, wherein redeploying the one or more operators back to the another of the at least two upstream processing elements comprises:
    un-fusing the one or more operators from the multiple input port processing element;
    re-fusing the one or more operators into the another of the at least two upstream processing elements;
  redeploying at least one operator from the selected one of the at least two upstream processing elements to the multiple input port processing element, wherein redeploying at least one operator from the selected one of the at least two upstream processing elements to the multiple input port processing element comprises fusing the at least one operator into the multiple input port processing element.

12. The method as recited in claim 2, wherein each of the plurality of operators fused together in the selected one of the at least two upstream processing elements is implemented using one or more threads, and wherein redeploying the at least one operator from the selected one of the at least two upstream processing elements to the multiple input port processing element further comprises terminating the one or more threads associated with the at least one operator without interrupting the processing of the other fused operators within the selected one of the at least two upstream processing elements.

13. The system as recited in claim 7, wherein each of the plurality of operators fused together in the selected one of the at least two upstream processing elements is implemented using one or more threads, and wherein redeploying the at least one operator from the selected one of the at least two upstream processing elements to the multiple input port processing element further comprises terminating the one or more threads associated with the at least one operator without interrupting the processing of the other fused operators within the selected one of the at least two upstream processing elements.

14. The computer program product as recited in claim 11, wherein redeploying at least one operator from the selected one of the at least two upstream processing elements to the multiple input port processing element comprises:
  selecting the at least one operator from among a plurality of operators fused together in the selected one of the at least two upstream processing elements, wherein each of the plurality of operators fused together in the selected one of the at least two upstream processing elements is implemented using one or more threads;
  terminating the one or more threads associated with the at least one operator without interrupting the processing of the other fused operators within the selected one of the at least two upstream processing elements;

un-fusing the at least one operator from the selected one of the at least two upstream processing elements;
fusing the at least one operator into the multiple input port processing element.

15. The method as recited in claim 2, wherein redeploying at least one operator from the selected one of the at least two upstream processing elements to the multiple input port processing element is performed autonomously and further comprises:
   generating a notification for the redeployed operator(s), wherein the notification specifies the at least one operator that was/were redeployed, the upstream processing element from which the at least one operator was/were redeployed, the multiple input port processing element and the compute node into which the at least one operator was/were redeployed, and circumstance based on the measured data flow rate leading to the redeployment of the at least one operator;
   transmitting the notification to a system administrator.

16. The system as recited in claim 7, wherein redeploying at least one operator from the selected one of the at least two upstream processing elements to the multiple input port processing element is performed autonomously and further comprises:
   generating a notification for the redeployed operator(s), wherein the notification specifies the at least one operator that was/were redeployed, the upstream processing element from which the at least one operator was/were redeployed, the multiple input port processing element and the compute node into which the at least one operator was/were redeployed, and circumstance based on the measured data flow rate leading to the redeployment of the at least one operator;
   transmitting the notification to a system administrator.

17. The computer program product as recited in claim 11, wherein redeploying at least one operator from the selected one of the at least two upstream processing elements to the multiple input port processing element is performed autonomously and further comprises:
   generating a notification for the redeployed operator(s), wherein the notification specifies the at least one operator that was/were redeployed, the upstream processing element from which the at least one operator was/were redeployed, the multiple input port processing element and the compute node into which the at least one operator was/were redeployed, and circumstance based on the measured data flow rate leading to the redeployment of the at least one operator;
   transmitting the notification to a system administrator.

* * * * *